United States Patent [19]

Wada et al.

[11] Patent Number: 5,243,168
[45] Date of Patent: Sep. 7, 1993

[54] ELECTRIC DISCHARGE MACHINE

[75] Inventors: Mitsuyoshi Wada; Takuji Magara, both of Nagoya, Japan

[73] Assignee: Mitsubishi Denki K.K., Tokyo, Japan

[21] Appl. No.: 800,425

[22] Filed: Nov. 29, 1991

[30] Foreign Application Priority Data

Nov. 30, 1990 [JP] Japan .................................. 2-330410
Jul. 30, 1991 [JP] Japan .................................. 3-189844

[51] Int. Cl.⁵ .............................................. B23H 1/10
[52] U.S. Cl. ................................................. 219/69.14
[58] Field of Search .......................... 219/69.14, 69.17; 204/129.6, 224.14

[56] References Cited

U.S. PATENT DOCUMENTS 4,289,947  9/1981  Inoue ................................. 219/69.14
4,839,488  6/1989  Katoh et al. ...................... 219/69.14

FOREIGN PATENT DOCUMENTS 63-52928  3/1988  Japan .
2-48129   2/1990  Japan ................................ 219/69.14

Primary Examiner—Geoffrey S. Evans
Attorney, Agent, or Firm—Sughrue, Mion, Zinn, Macpeak & Seas

[57] ABSTRACT

An electric discharge machine having a machining solution tank for storing a machining solution containing machining particles, a machining vessel filled with the machining solution to machine a workpiece, and a machining solution circulating system for circulating the machining solution between the machining solution tank and the machining vessel. The vessel has a pair of machining solution jetting devices arranged in the machining vessel in opposition to each other, the machining solution jetting means jets the machining solution delivered thereto, through the machining solution circulating system from the machining solution tank, towards the workpiece in the machining vessel in a predetermined order.

7 Claims, 9 Drawing Sheets

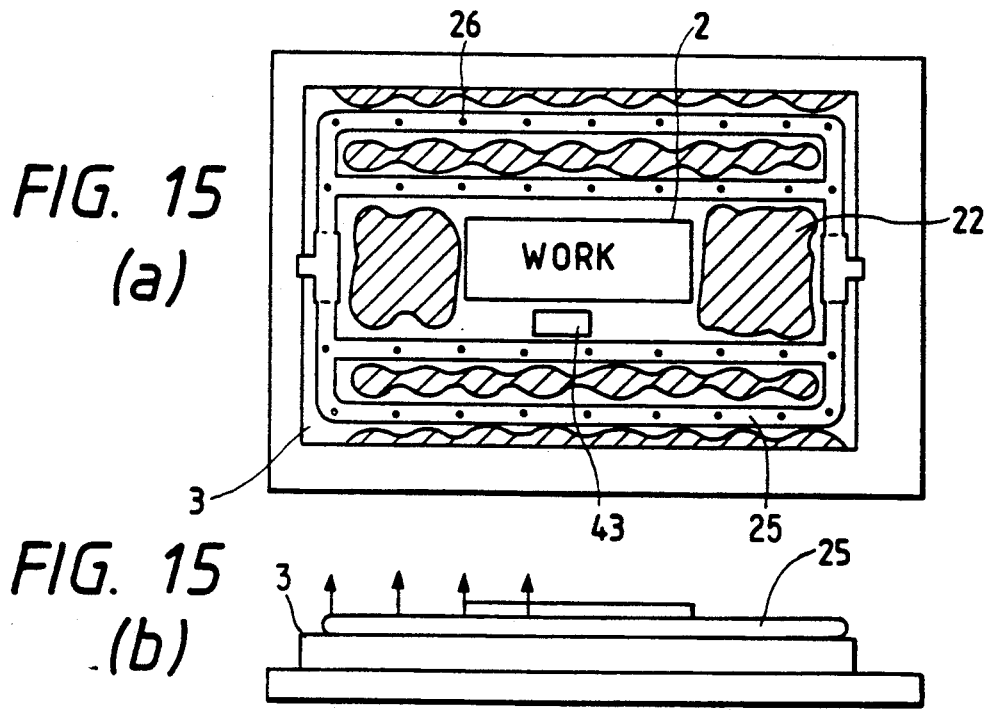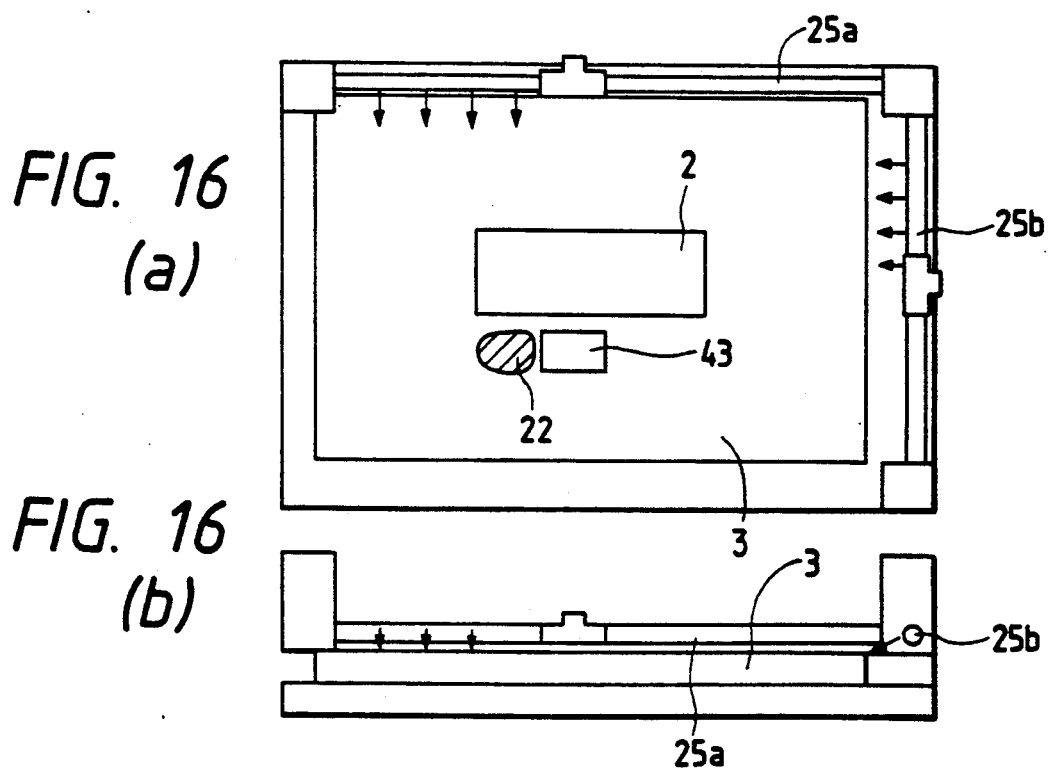

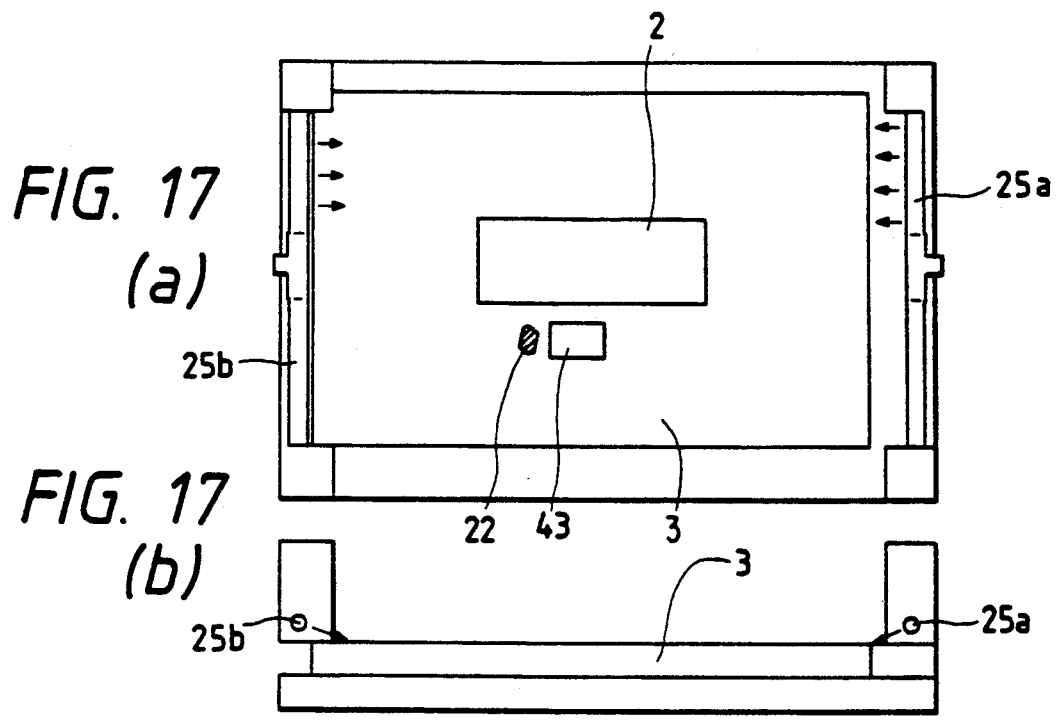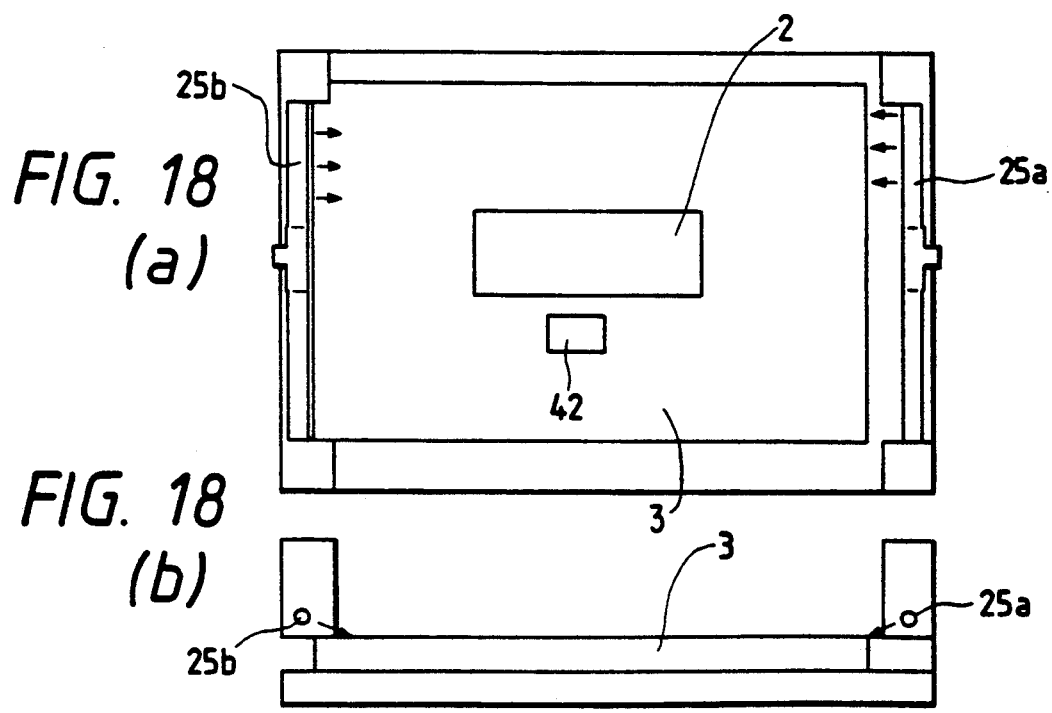

ELECTRIC DISCHARGE MACHINE

BACKGROUND OF THE INVENTION

This invention relates to an electric discharge machine for performing an electric discharge machining operation by using a machining solution containing machining particles.

An electric discharge machining technique is well known in the art in which the high temperature energy produced by an electric discharge circuit is utilized to melt an electrically conductive material, such as a metal material, or subject it to surface treatment. In an electric discharge machine operating of this technique, in order to obtain electrical insulation for an electric discharge machining operation, generally the discharge gap is filled with a machining solution which has electrical insulating characteristics. That is, the machining solution is used for electric insulation. In addition, the machining solution is used for removal of the sludge formed during discharge machining, and for cooling the material being machined.

On the other hand, it is known in the art that, when a machining solution is used which contains machining particles about 10 to 40 μm in particle size to a mixing density of is about 20 g/l, a mirror surface machining can be achieved which is heretofore impossible to perform in the case where the confronting area of the electrode and a material to be machined (hereinafter referred to as "a workpiece", when applicable) is large. In addition, it is also known that, with such a machining solution, the physical characteristics, such as corrosion resistance and wear resistance, of the workpiece are improved, depending on the material of the machining particles.

The technique is also well known in the art in which the machining solution is mixed with machining particles such as the above-described machining particles, to form the surface layer of a workpiece. This technique may greatly increase the range of application of electric discharge machining; however, it involves problems to be solved in practical use.

FIG. 14 shows a conventional electric discharge machine using machining particles. In FIG. 14, reference numeral 1 designates an electrode; 2, a material to be machined (or a workpiece); 3, a surface plate on which the workpiece 2 is placed, the surface plate 3 being set on the bottom of a machining vessel 4; 5, a machining solution tank containing a machining solution 7 mixed with machining particles 6; and 8, a machining solution supplying pipe connected between the machining vessel 4 and the machining solution tank 5, the pipe 8 being provided with a pump 9 and a control valve 10.

Further in FIG. 14, reference numeral 11 designates a drain pipe with a drain control valve 29, which is adapted to return the machining solution in the machining vessel 4 into the machining solution tank 5; 12, a coarse machining solution tank for containing a coarse machining solution. The coarse machining solution tank is divided into two vessels; that is, a used machining solution vessel 12a for containing the used machining solution received from the machining vessel 4, and a purified machining solution vessel 12b for containing a purified machining solution which is the machining solution obtained by filtering the used machining solution in the used machining solution vessel 12a.

Further in FIG. 14, reference numeral 14 designates a filter for removing machining particles from the machining solution. The filter 14 is provided in a pipe 15 connected between the used machining solution vessel 12a and the purified machining solution vessel 12b. The used machining solution in the used machining solution vessel 12a is supplied to the filter 14 by a pump 16, where it is filtered. Further in FIG. 14, reference numeral 17 designates a coarse machining solution supplying pipe connected between the purified machining solution vessel 12b and the machining vessel 4, and is provided with a pump 18 and a control valve 19; 20, a used machining solution drain pipe, which is used to deliver the used machining solution in the machining vessel 4 into the used machining solution vessel 12a through a drain control value 21; and 22, the precipitate of machining particles in the machining vessel 4.

The operation of the conventional electric discharge machine thus organized will be described.

In an ordinary coarse machining operation, the pump 18 is operated to supply the purified machining solution from the purified machining solution vessel 12b to the machining vessel 4 through the control valve 19 and the coarse machining solution supplying pipe 17. In the machining vessel 4, electric discharges are induced between the electrode 1 and the workpiece 2 which is fixedly placed on the surface plate 3; that is, the workpiece 2 is subjected to electric discharge machining. In this operation, sludge 13 is formed.

As a result, the machining solution contains the sludge 13. The machining solution in the machining vessel 4 is returned through the used machining solution drain pipe 20 and the drain control valve 21 into the used machining solution vessel 12a. The used machining solution thus returned is sent to the filter 14 by the pump 16, where the sludge 13 is removed from the used machining solution; that is, the latter is purified. The machining solution thus purified is stored in the purified machining solution vessel 12b so as to be used again. The removal of sludge 13 from the used machining solution is carried out all times or intermittently during discharge machining. Thus, a coarse machining operation is performed while the machining solution containing no sludge is being supplied into the machining vessel 4.

After the coarse machining operation, a fine machining operation is carried out, for instance, for surface treatment. In this operation, the coarse machining solution is returned, in its entirety, into the used machining solution vessel 12a, and thereafter the pump 9 is operated to supply the machining solution 7 containing machining particles 6 from the machining solution tank 5 to the gap between the electrode and the workpiece (hereinafter referred to as "an interelectrode gap", when applicable) through the control valve 10.

In an electric discharge machining operation which is carried out while a machining solution containing machining particles is being held between the electrode and the workpiece, the concentration of machining particles in the machining solution must be maintained constant at all times, because it greatly affects the machining stability. For this purpose, during the machining operation, the machining solution 7 is circulated at all times; more specifically, the machining solution 7 is returned through the drain pipe 11 and the drain control valve 19 into the machining solution tank 5 while being supplied into the machining vessel 4 from the machining solution tank 5.

The conventional electric discharge machine is designed as described above. In the machine, the machining solution is circulated so as to supply the machining particles to the interelectrode gap at all times. However, in general, the machining vessel is large in volume, and the flow rate of the machining solution thus circulated is low, and therefore the machining particles in the machining solution are liable to precipitate. Hence, most of the machining particles in the machining solution precipitate on the bottom of the machining vessel as indicated at 22.

After a finish machining operation, the machining solution containing machining particles is returned into the machining solution tank; however, a larger part of the precipitate of machining particles remains in the machining vessel as it is. Hence, the next coarse machining operation will suffer from the following difficulty: That is, while the coarse machining solution supplied into the machining vessel is being circulated, the machining particles flow into the used machining solution vessel 12a, thus being removed by the filter 16. Accordingly, the concentration of machining particles in the machining solution is decreased, which may result in the reduction of surface roughness, in the occurrence of arcs, or in the abnormal consumption of the electrode.

This difficulty may be eliminated by the following method: During discharge machining, the operator agitates the machining solution in the machining vessel to minimize the precipitation of machining particles, and after the machining operation, the operator removes the precipitate of machining particles from the machining vessel into the machining solution tank 5 by himself, or supplies machining particles additionally into the machining solution tank. However, such methods obstruct automation of the electric discharge machine, and involves problems to be solved in economical operation and in running cost.

A device for agitating the machining solution during discharge machining has been proposed in the art (Japanese Patent Application (OPI) No. 144198/1975 (the term "OPI" as used herein means an "unexamined published application")). In the device, nozzles are arranged on a cylindrical member set around the electrode, so to cause the machining solution to flow like a tornado about the electrode. The device is advantageous in that the sludge can be removed from the interelectrode gap; however, it is still disadvantageous in that, in the case where a machining solution containing machining particles is used, the machining particles will precipitate outside the cylindrical member, so that the concentration of machining particles in the machining solution is decreased as in the above-described case.

SUMMARY OF THE INVENTION

The foregoing object of the invention has been achieved by the provision of an electric discharge machine comprising, a machining solution tank for storing a machining solution containing machining particles, a machining vessel filled with the machining solution to machine a workpiece, and a machining solution circulating system for circulating the machining solution between the machining solution tank and the machining vessel. The circulating system, according to the invention further comprises, a pair of machining solution jetting means arranged in the machining vessel in such a manner as to confront each other. The machining solution jetting means lets the machining solution delivered thereto through the machining solution circulating system from the machining solution tank, towards the workpiece in the machining vessel in a predetermined order.

In the electric discharge machine of the invention, the machining solution jetting means is activated in a predetermined order to jet the machining solution containing machining particles towards the workpiece in the machining vessel. As a result, the streams of machining solution are formed in the machining vessels in such a manner that they flow alternately in opposite directions. Accordingly, the streams of machining solution scarcely stagnate in the machining vessel, that is, no dead zone is formed for the machining solution in the machining vessel. This feature, preventing precipitation of the machining particles, disperses the machining particles uniformly in the machining solution.

One of the machining solution supplying pipes arranged in parallel is connected to the filter unit, where the machining solution containing machining particles is divided into a first machining solution containing no machining particles and a second machining solution containing machining particles at a high concentration. The second machining solution is returned into the machining solution tank, and only the first machining solution is jetted by the machining solution jetting means. By jetting the first machining solution which does not contain machining particles, the machining particles deposited on the bottom of the machining vessel can be periodically washed away, so as to be collected into the machining solution tank.

Hence, the concentration of machining particles in the machining solution in the machining solution tank is maintained constant at all times. The machining solution thus maintained is supplied to the interelectrode gap through another machining solution supplying pipe. Accordingly, the concentration of machining particles in the machining solution applied to the interelectrode is also maintained constant at all times.

BRIEF DESCRIPTION OF THE DRAWINGS

FIGS. 15(a) and (b), 16(a) and (b), 17(a) and (b) and 18(a) and (b) are explanatory diagrams showing the results of the experiments wherein a machining solution is jetted in a machining vessel in various manners.

DETAILED DESCRIPTION OF THE PREFERRED EMBODIMENTS

Figure 1:
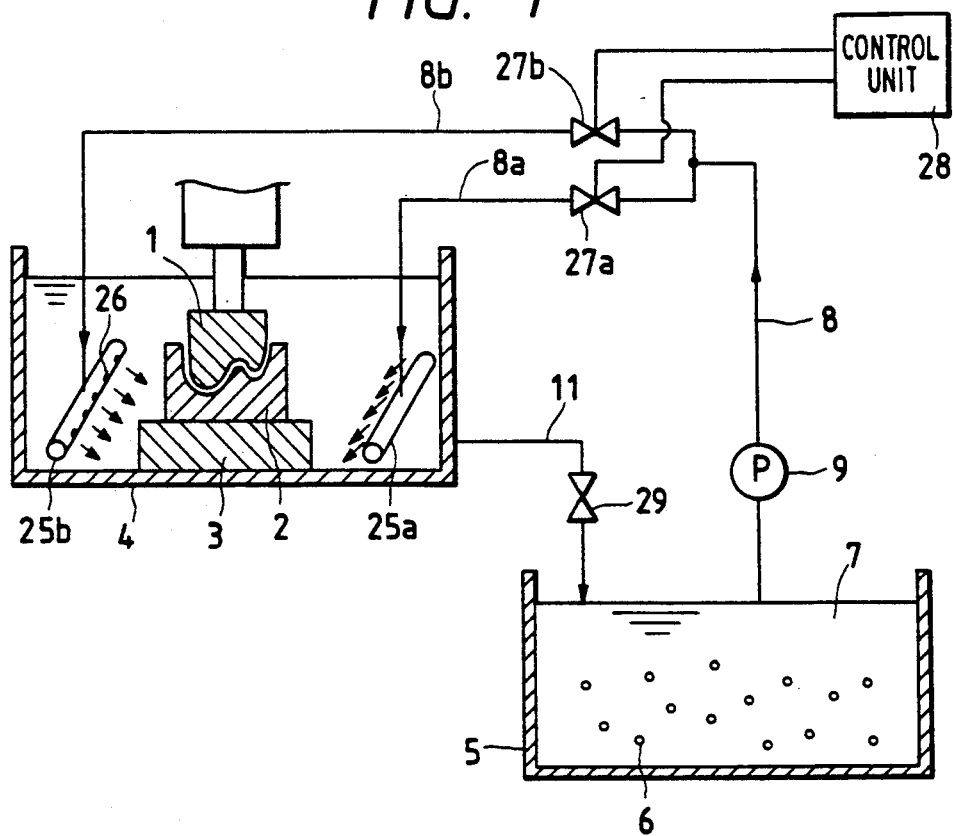
FIG. 1 is an explanatory diagram showing the arrangement of a first embodiment of an electric discharge machine according to this invention.
Figure 14:
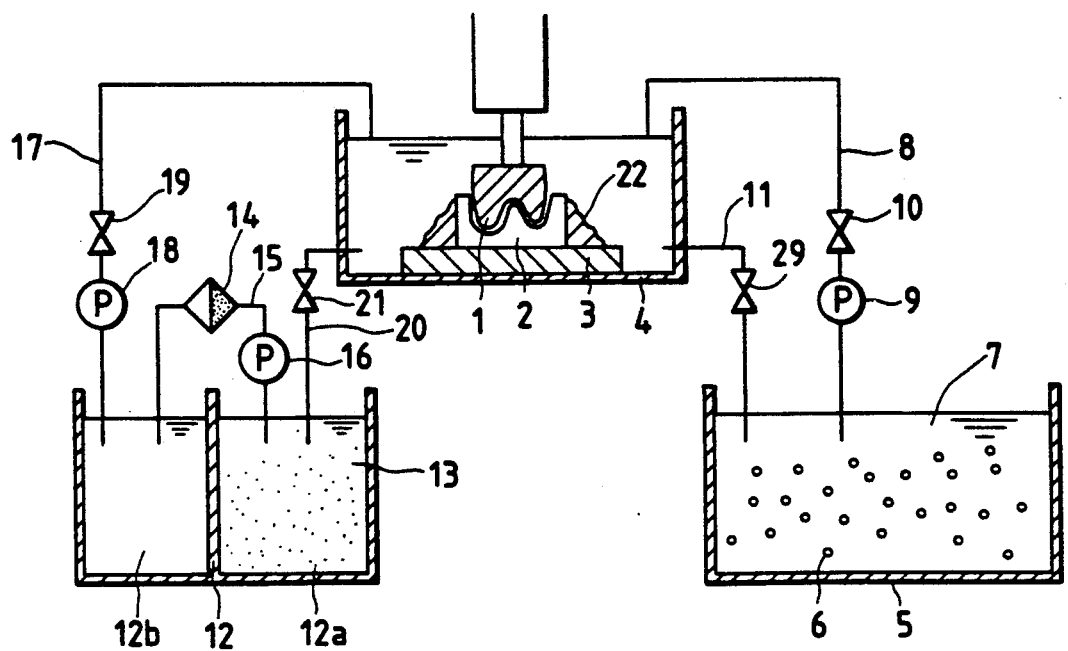
FIG. 14 is an explanatory diagram showing the arrangement of a conventional electric discharge machine.

FIG. 1 shows the arrangement of a first embodiment of an electric discharge machine according to this invention. In FIG. 1, a coarse machining solution tank and its circulation system similar to those in FIG. 14 are not shown. In FIG. 1, parts corresponding functionally to those which have been described with reference to FIG. 14 are therefore designated by the same reference numerals or characters.

In the first embodiment of the electric discharge machine, the machining solution supplying pipe 8 forming a part of the machining solution supplying system branches into two machining solution supplying pipes 8a and 8b. The end portions of the machining solution supplying pipes 8a and 8b are connected to machining solution jetting units 25a and 25b which are disposed in the machining vessel 4 in such a manner that they are in opposition to each other. Each of the machining solution jetting units 25a and 25b is a cylindrical pipe with both ends closed which has a plurality of small nozzle holes 26 formed in the cylindrical wall in such a manner that the machining solution is jetted towards the workpiece 2. Preferably, the machining solution is jetted towards the surface plate 3 from slightly obliquely above so as to flow along the upper surface of the latter towards the workpiece 2 (cf. FIG. 2).

In FIG. 1, reference characters 27a and 27b designate control valves provided for the machining solution supplying pipes 8a and 8b, respectively. The control valves 27a and 27b are controlled by a control unit 28. The machining solution supplying pipes 8, 8a and 8b, the control valves 27a and 27b, the drain pipe 11, and the drain control valve 29 form a system for circulating the machining solution 7 containing machining particles 6 between the machining solution tank 5 and the machining vessel 4. The machining solution tank 5 is provided with an agitator (not show) for agitating the machining solution 7 containing machining particles 6.

Now, the operation of the first embodiment of the electric discharge machine will be described.

Figure 2:
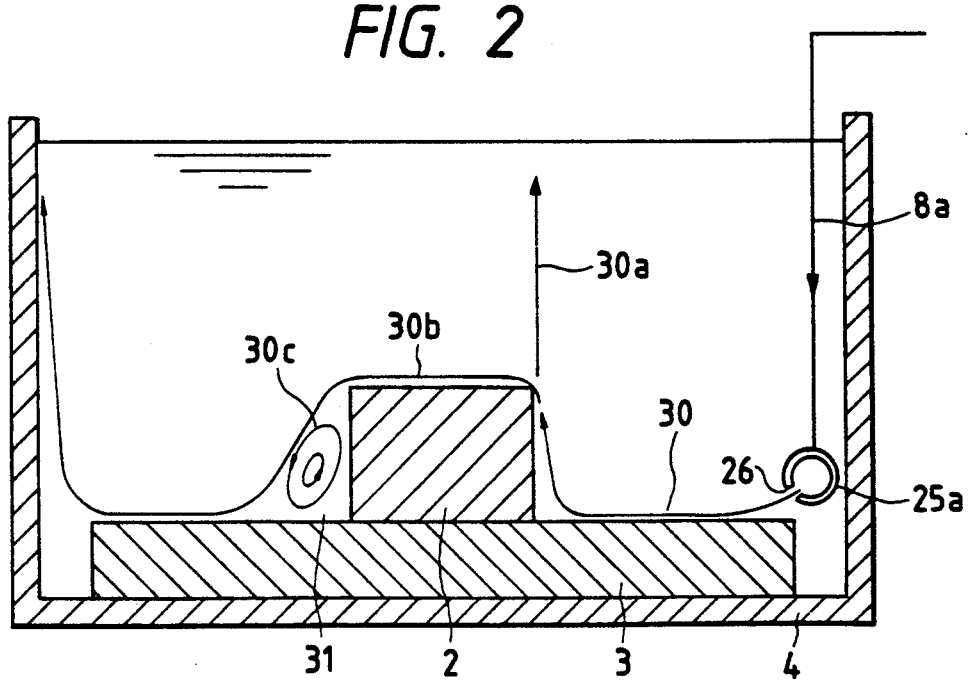
FIGS. 2 and 3 are explanatory diagrams for a description of the operation of the electric discharge machine shown in FIG. 1.

The pump 9 is operated to supply the machining solution 7 containing machining particles 6 from the machining solution tank 5 to the machining solution jetting units 25a and 25b, so that the machining solution is jetted alternately from the units 25a and 25b. When the control unit 28 is operated to open the control valve 27a thereby to cause the machining solution jetting unit 25a to jet the machining solution, the machining solution 7 flows in the machining vessel 4. That is, as shown in FIG. 2, there are streams 30 of machining solutions; i.e., a stream 30a of machining solution which, striking against the workpiece 2, flows up the latter 2, and a stream 30b of machining solution which flows along the upper surface of the workpiece 2, and, striking against the inner wall of the machining vessel 4, flows up the inner wall.

In this case, most of the machining particles 6 mixed in the machining solutions flow together with the two streams 30a and 30b of machining solution. Hence, the machining particles are uniformly distributed in the machining solution without precipitating on the surface plate 3. However, it should be noted that a dead zone 31 is formed behind the workpiece 2, and in the dead zone 31 the machining solution forms a vortex 30c; that is, the machining solution stagnates there. Therefore, if, under this condition, the machining solution is jetted continuously from the machining solution jetting unit 25a, then the machining particles starts to precipitate in the dead zone 31, and they may precipitate to adversely affect the discharge machining operation.

Figure 3:
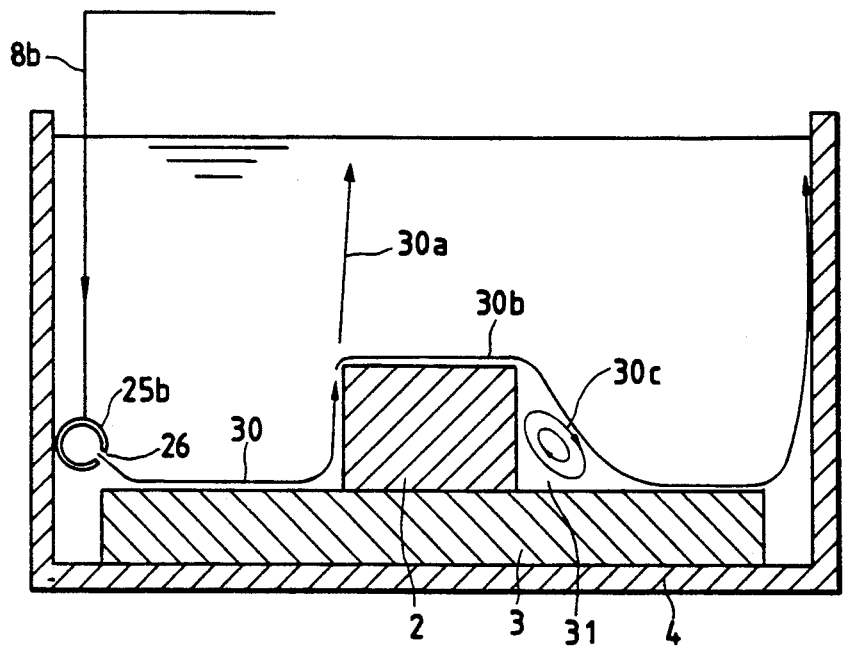

Therefore, before this difficulty occurs, the control unit 28 is so operated as to close the control valve 27a thereby to suspend the operation of the machining solution jetting unit 25a, and to open the control valve 27b thereby to cause the machining solution jetting unit 25b to jet the machining solution in the opposite direction. In this case, the machining solution flows as shown in FIG. 3, that is, the streams of machining solution are just opposite in direction to the streams of machining solution in FIG. 2. This will eliminate the above-described difficulty wherein the machining solution forms the vortex 30c in the dead zone 31.

The above-described machining solution jetting operations of the machining solution jetting units are carried out alternately. Therefore, no dead zone is formed in the machining vessel 4, the precipitation of machining particles is prevented, that is, the machining particles 6 are uniformed distributed in the machining solution 7. Thus, with the electric discharge machine, suitable discharge machining conditions can be provided.

Figure 4:
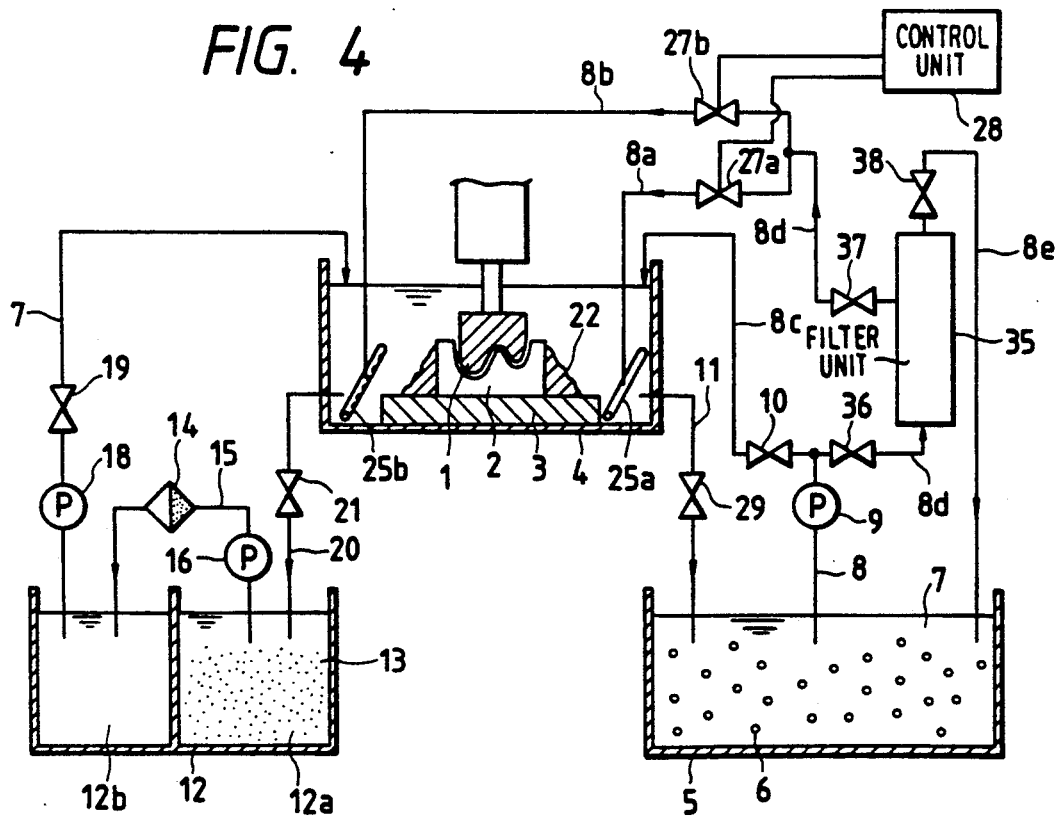
FIG. 4 is an explanatory diagram showing the arrangement of a second embodiment of the electric discharge machine according to the invention.

FIG. 4 shows the arrangement of a second embodiment of the electric discharge machine according to the invention.

In the electric discharge machine shown in FIG. 2, the machining solution supplying pipe 8 branches into two parallel pipe lines 8c and 8d. The pipe line 8d is provided with a cylindrical filter unit 35, which is connected to the above-described machining solution supplying pipes 8a and 8b. The machining solution supplying pipes 8a and 8b are connected to the above-described machining solution jetting units 25a and 25b, respectively. Similarly as in the case of FIG. 8, the machining solution 7 containing machining particles 6 is supplied through the machining solution supplying pipes 8 and 8c into the machining vessel 4.

The machining solution 7 containing machining particles 6 is supplied through the pipe line 8d to the filter unit 35, where the machining particles 6 are removed from the machining solution 7, so that a first machining solution containing no machining particles 6, and a second machining solution containing machining particles at a high concentration are obtained. Only the first machining solution which does not contain machining particles is supplied through the pipe line 8d to the machining solution supplying pipes 8a and 8b, so that it is jetted alternately from the machining solution jetting units 25a and 25b.

The second machining solution containing machining particles at a high concentration is returned through a pipe line 8e into the machining solution tank 5. In FIG. 4, reference numerals 36 and 37 designate control valves provided for the pipe line 8d; and 38, a control valve provided for the pipe line 8c. The other arrangements of the electric discharge machine are the same as those of the electric discharge machine shown in FIG. 14.

The operation of the second embodiment of the electric discharge machine thus organized will be described.

Figure 5:
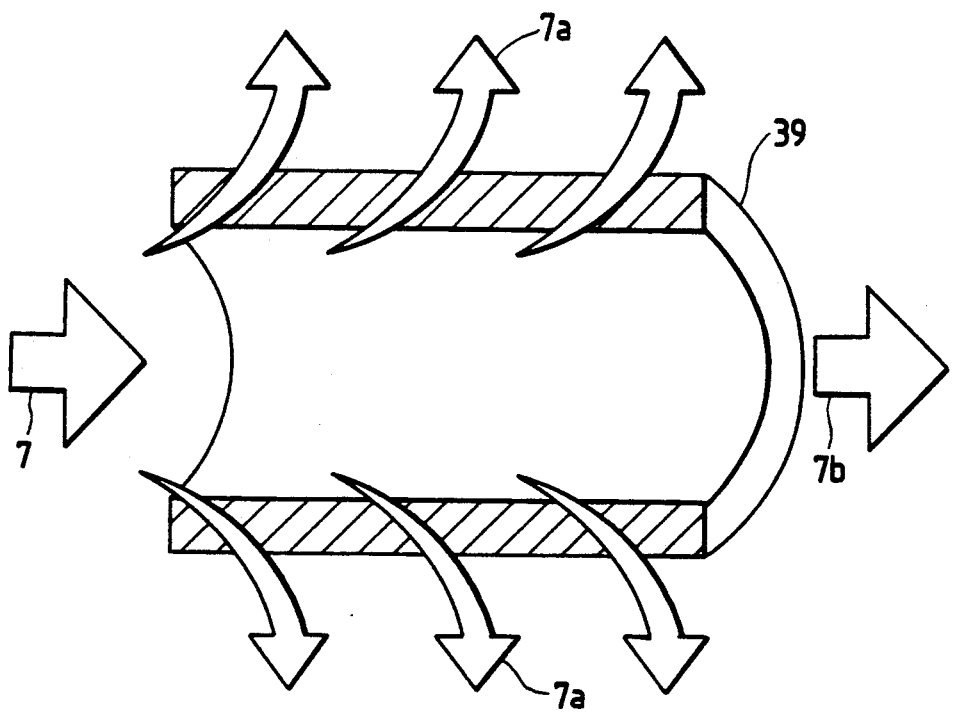
FIG. 5 is an explanatory diagram for a description of the operation of a filter unit in the electric discharge machine shown in FIG. 4.

After a fine machining operation, the machining solution 7 containing machining particles 6 in the machining vessel 4 is returned through the drain pipe 11 and the drain control valve 29 into the machining solution tank 5. When the machining solution has been removed, in its entirety, from the machining vessel 4, the control valve 10 is closed, and the control valve 36 is opened, and under this condition the pump 9 is operated to supply the machining solution 7 containing machining particles 6 to the filter unit 35. The machining solution thus supplied, as shown in FIG. 5, is divided by a film filter 39 in the filter unit 35 into a machining solution 7a containing no machining particles, and a machining solution 7b containing machining particles at a high concentration.

When the machining solution 7 containing machining particles 6 is allowed to flow along the inner wall of the cylindrical film filter 39, the pressures inside and outside the film filter 39 become different from each other, so that the machining solution 7 tends to go outside through the film filter 39. In the case where the mesh diameter of the film filter 39 is smaller than the particle size of the machining particles 6, the latter 6 cannot go through the film filter 39, so that they are deposited on the inner wall of the film filter 39, and accordingly, only the machining solution 7a goes outside through the film filter 39. The machining solution 7a is supplied through the pipe line 8d and the control valve 37 and through the machining solution supplying pipes 8a and 8b into the machining vessel 4.

In this case, only one of the two control valves 27a and 27b is opened, and accordingly the machining solution 7a is jetted only from one of the machining solution jetting units 25a and 25b for which the control valves 27a and 27b are provided, respectively. The machining solution 7a thus jetted washes away the machining particles from the machining vessel 4, that is, the machining solution absorbing the machining particles is returned into the machining solution tank 5 through the drain pipe 11 and the drain control valve 29.

Figure 6:
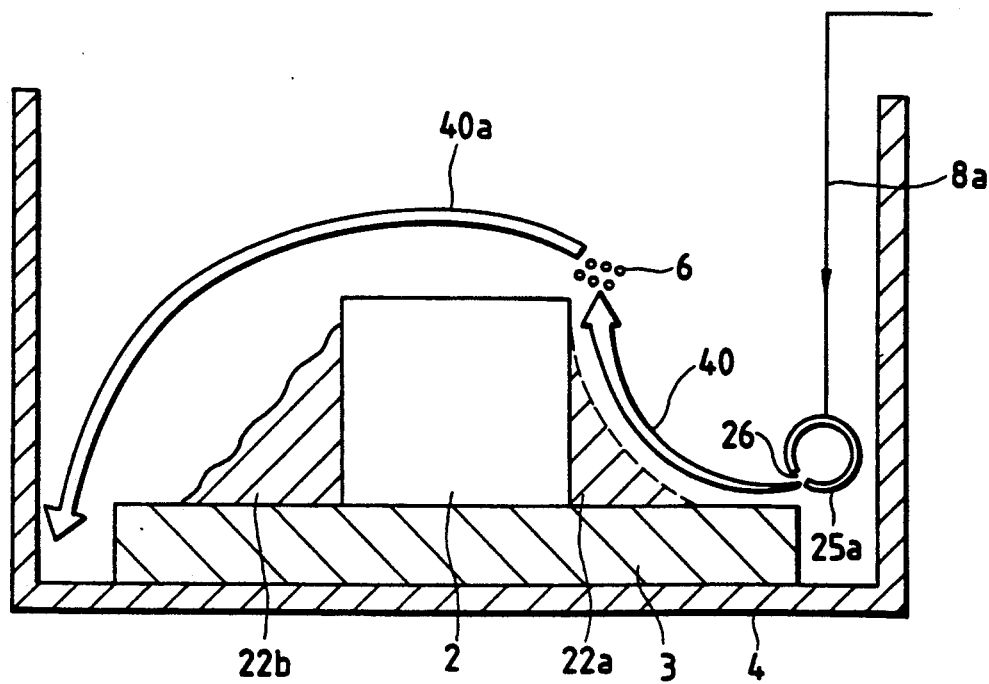
FIGS. 6 and 7 are explanatory diagrams for a description of the operation of the electric discharge machine shown in FIG. 4.
Figure 7:
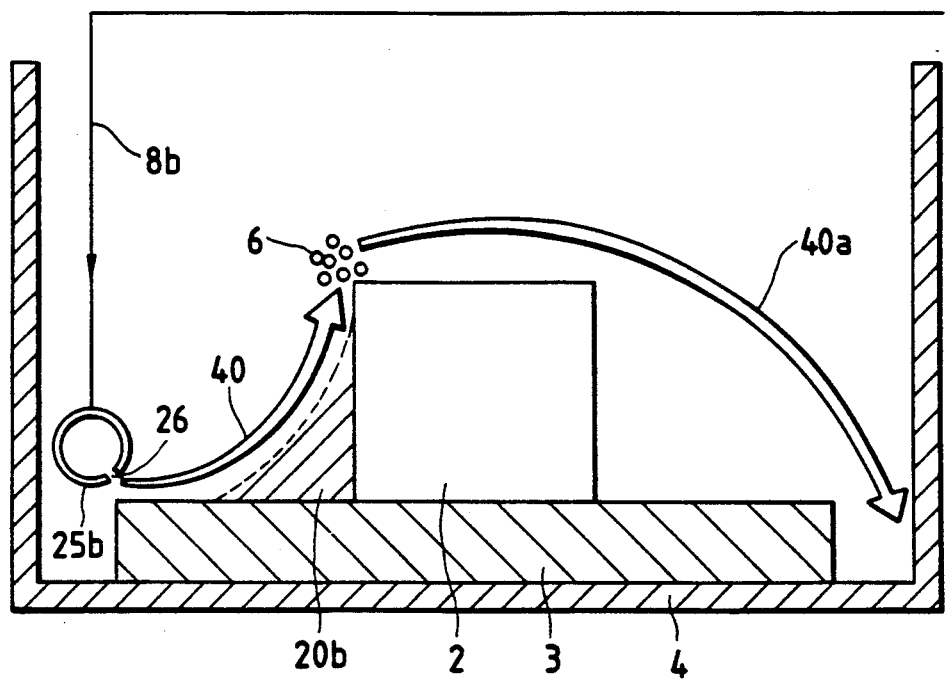

FIGS. 6 and 7 show how the machining particles remaining in the machining vessel are removed with the machining solution which, passing through the filter unit 35, does not contain machining particles. In the case of FIG. 6, the control valve 27a is opened by the control unit 28 while the control valve 27b is closed. In the case of FIG. 7, the control valve 27a is closed by the control unit 28 while the control valve 27b is opened.

When the control valve 27a is opened, the machining solution 7a which, passing through the filter unit 35, contains no machining particles is supplied only to the machining solution jetting unit 25a, so that it is jetted towards the workpiece 2 from the nozzle holes 26 of the machining solution jetting unit 25a. As a result, a stream of machining solution is formed as indicated at 40 in the machining vessel 4. That is, the stream of machining solution 40 runs along the deposit of machining particles 22a in the machining vessel 4. Thus, while enclosing the machining particles 6, the machining solution flows over the workpiece 2 as indicated at 40a to the discharge outlet (not shown) of the machining vessel.

In this operation, it is impossible to completely wash away the deposit of machining particles 22b. Therefore, after the deposit of machining particles 22a has been washed away, the control valve 27a is closed to suspend the machining solution jetting operation of the machining solution jetting unit 25a, and then the control valve 27b is opened to start the operation of the other machining solution jetting unit 25b.

As a result, in the machining vessel 4, the machining solution 7a flows as shown in FIG. 7. In this case, the direction of flow of the machining solution 7a is opposite to the direction of flow of the machine solution 7a in the case of FIG. 6. Hence, the region where the machining solution flows insufficiently is eliminated by the machining solution flowing as shown in FIG. 7.

Thus, the deposit 22b of machining particles is washed away; that is, the machining particles can be washed away even from the region where the machining solution flows insufficiently.

On the other hand, the machining particles deposited on the inner wall of the film filter 39 of the filter unit 35 are treated as follows: That is, the machining solution 7 flowing in the film filter 39 absorbs the machining particles, thus forming the aforementioned machining solution 7b containing machining particles at a high concentration. The machining solution 7b is returned through the pipe line 8e and the control valve 38 into the machining solution tank 5. Hence, before a finish machining operation starts, the machining particles remaining from the preceding finish machining operation can be completely washed away from the machining vessel. As was described above, the machining solution 7b is returned through the pipe line 8e and the control valve 38 into the machining solution tank 5. Therefore, in the next finish machining operation, the machining solution 7 containing machining particles at a predetermined concentration can be supplied to the inter-electrode gap. That is, satisfactory discharge machining conditions can be obtained.

During discharge machining, the machining solution 7 which does not contain particles may be jetted alternately from the machining solution jetting units 25a and 25b so as to prevent the precipitation of machining particles 6 in the machining vessel 4.

Figure 8:
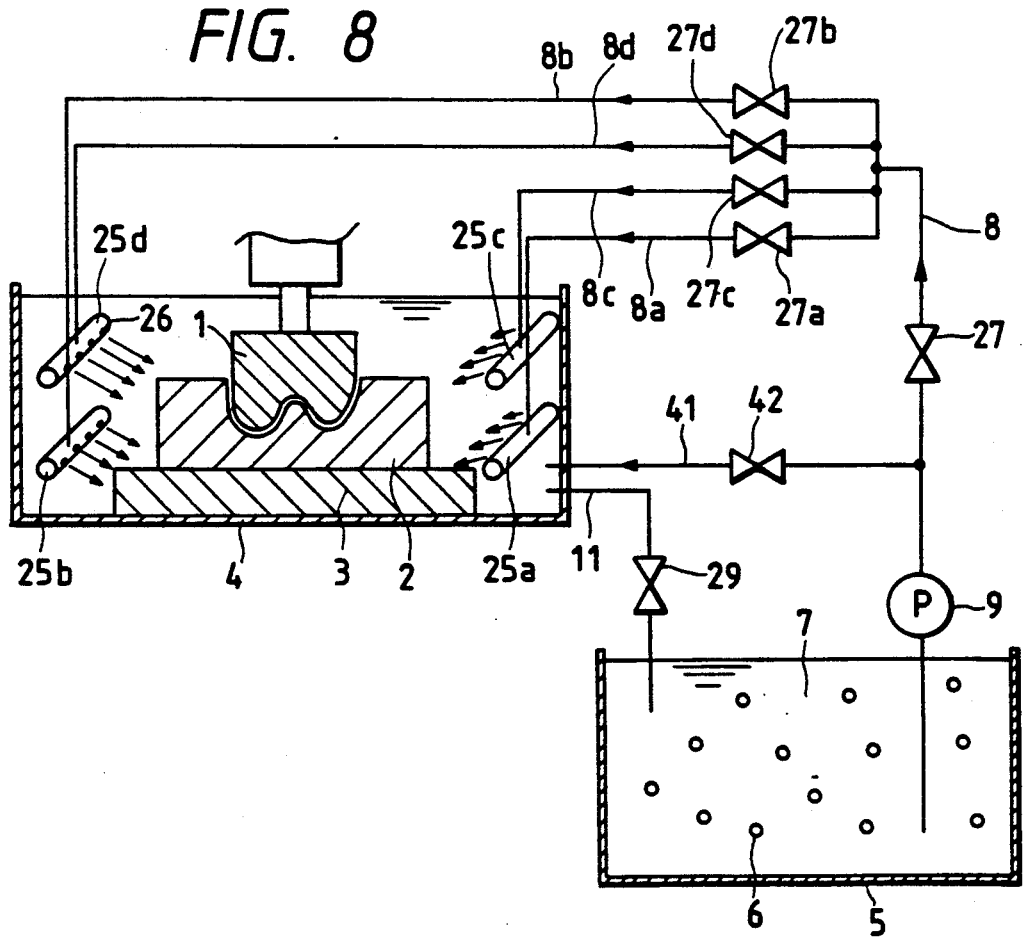
FIG. 8 is an explanatory diagram showing the arrangement of a third embodiment of the electric discharge machine according to the invention.
Figure 9:
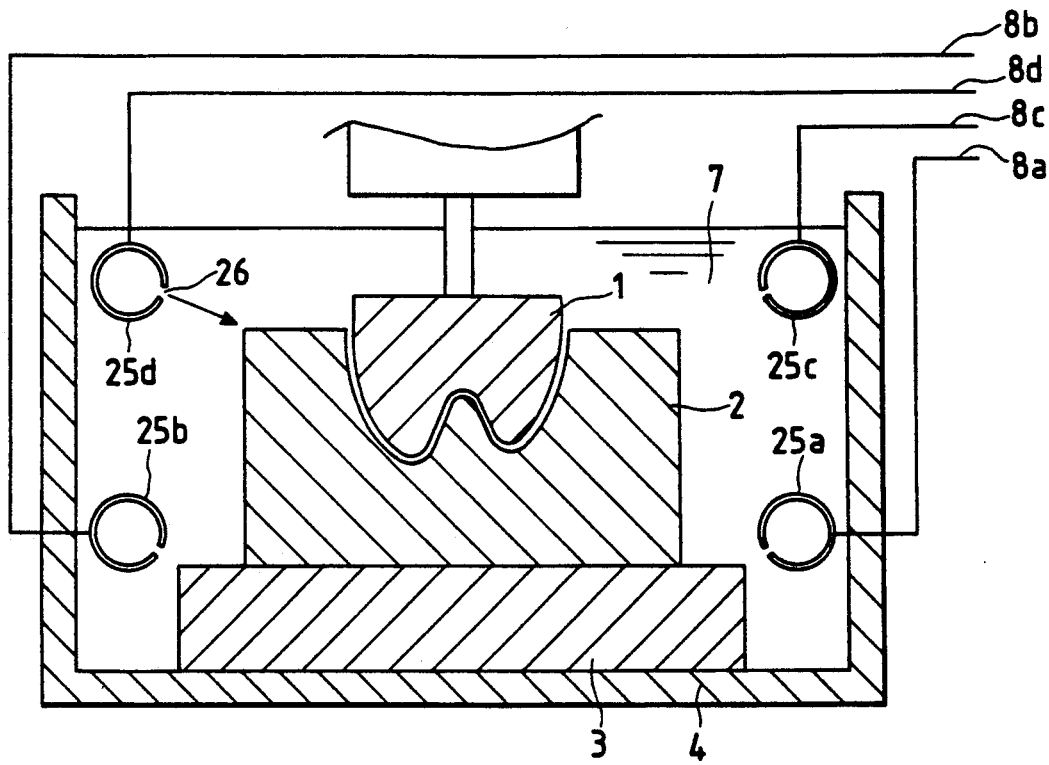
FIGS. 9 through 13 are explanatory diagrams for a description of the operation of the electric discharge machine shown in FIG. 8.

FIG. 8 shows the arrangement of a third embodiment of the electric discharge machine according to the invention. In FIG. 8, a coarse machining solution tank and its machining solution circulating system are not shown which are similar to those in FIG. 14. In FIG. 8, parts corresponding functionally to those which have been already described with reference to FIG. 14 are therefore designated by the same reference numerals or characters.

In the electric discharge machine shown in FIG. 8, a machining solution supplying pipe 41, a part of the machining solution supplying system, is connected in parallel to the machining solution supplying pipe 8, which branches to four parallel machining solution supplying pipes 8a, 8b, 8c and 8d. These pipes 8a, 8b, 8c and 8d are connected to machining solution jetting units 25a, 25b, 25c and 25d, respectively, which are arranged in the machining vessel 4 in such a manner that they are in opposition to one another. Each of the machining solutions jetting units 25a through 25d is in the form of a cylindrical pipe with both ends closed which has a plurality of small nozzle holes 26 in the cylindrical wall.

More specifically, the directions of nozzles holes 26 of the machining solution jetting units 25a and 25b are so determined that the machining solution is jetted towards the upper surface of the surface plate 3, preferably from slightly obliquely above. And the directions of nozzles holes 26 of the machining solution jetting units 25c and 25d are so determined that the machining solution 7 is jetted towards the upper surface of the workpiece 2, preferably from slightly obliquely above.

The machining solution jetting units 25c and 25d are so designed that they can be moved vertically according to the thickness of a workpiece 2, or several setting positions are provided for the units 25c and 25d. In FIG. 8, reference numeral 27 designates a control valve for the machining solution supplying pipe 8; and 27a, 27b, 27c and 27d, control valves provided for the machining solution supplying pipes 8a, 8b, 8c and 8d, respectively.

The operation of the third embodiment of the electric discharge machine thus organized will be described.

Before a finish machining operation is started after the coarse machining operation, it is necessary to fill the machining vessel 4 with the machining solution 7 containing machining particles 6. For this purpose, with the control valve 27 closed, the pump 9 is operated to supply the machining solution 7 from the machining solution tank 5 through the control valve 42 and the machining solution supplying pipe 42 into the machining vessel 4. After the machining vessel 4 is filled with the machining solution 7, the control valve 42 is closed whereas the control valve 27 is opened. Under this condition, with the aid of the pump 9, the machining solution is supplied to the machining solution jetting units 25a, 25b, 25c and 25d, and jetted from those jetting units 25a through 25d in a predetermined order.

Figure 10:
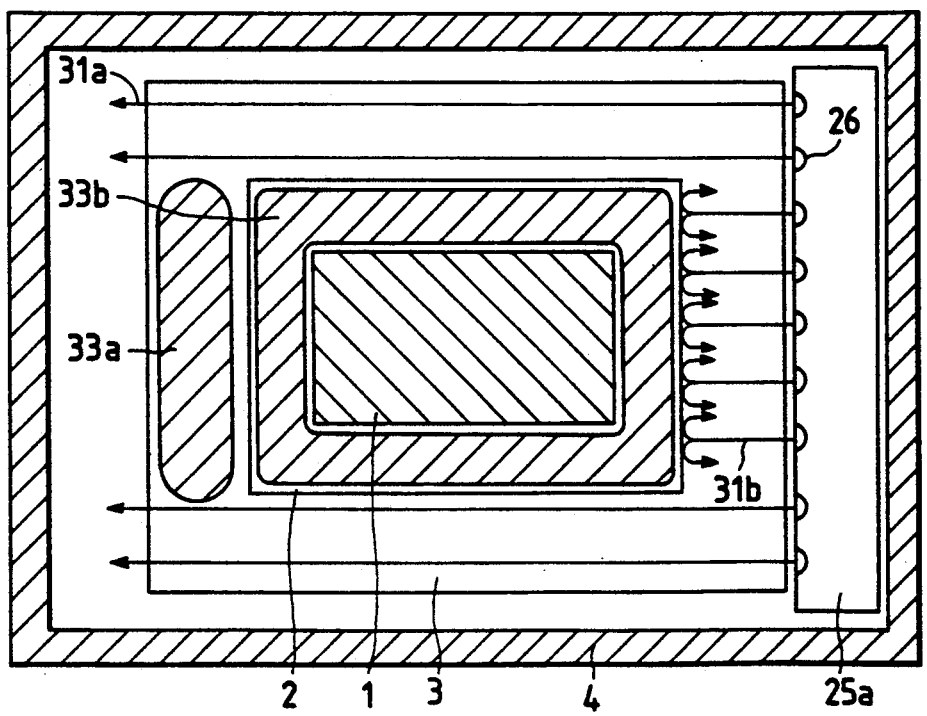

When the control valve 27a is opened, and the control valves 27b, 27c and 27d are closed, the machining solution is jetted from the machining solution jetting unit 25a in such a manner as to flow along the upper surface of the surface plate 3. In this case, first and second streams of machining solution 31a and 31b are formed as shown in FIG. 10. That is, the first streams of machining solution 31a flow along the upper surface of the surface plate 3, and the second streams of machining solution 31b strike against the workpiece 2 and return towards the machining solution jetting unit 25. Hence, most of the machining particles 6 contained in the machining solution are caused to flow together with the streams of machining solution 31a and 31b. Accordingly, the machining particles will not precipitate on the surface plate 3, and they will be dispersed uniformly in the machining solution 7.

However, in this operation, regions 33a and 33b are formed on the surface plate and the workpiece where the machining solution does not flow. Therefore, if, under this condition, the machining solution 7 is maintained jetted from the machining solution jetting unit 25, then the machining particles will precipitate in the above-described regions 33a and 33b where the machining solution will not flow. In this case, the machining particles may precipitate to the extent that they adversely affects the discharge machining operation.

Figure 11:
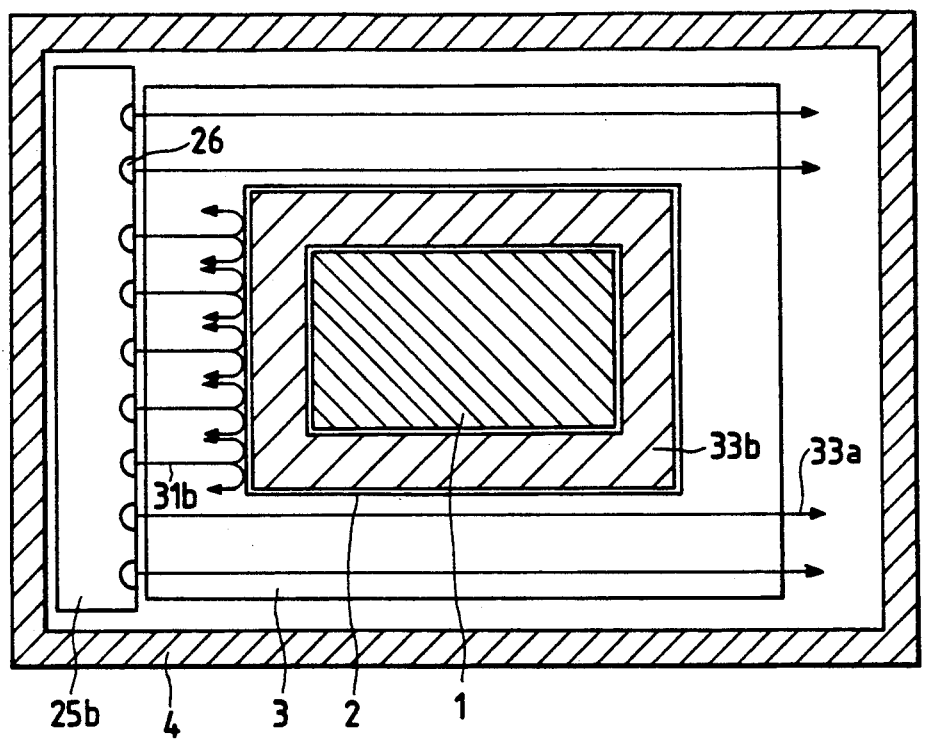

Hence, before the occurrence of this difficulty, the control valve 27a is closed to suspend the jetting operation of the machining solution jetting unit 25a, and then the control valve 27b is opened to cause the machining solution jetting unit 25b to jet the machining solution in the opposite direction as shown in FIG. 11. As is seen from the comparison of FIGS. 10 and 11, the streams of machining solution in FIG. 11 is opposite in direction to those in FIG. 10, which eliminates the region 33a where the machining solution does not flow. However, under this condition, the region 33b is not eliminated yet, and the precipitation of machining particles is continued.

In order to eliminate this difficulty, the control valve 27b is closed to suspend the machining solution jetting operation of the machining solution jetting unit 25b, and then the control valve 27c is opened to allow the machining solution jetting unit 25c to start jetting the machining solution towards the workpiece 2 which has been set at a predetermined level in accordance with the height or thickness of the workpiece. In this operation, streams of machining solution 32a and 32b are formed over the workpiece 2 as shown in FIG. 2, thus washing away most of the machining particles deposited on the region 33b of the workpiece 2. However, a region 33c is formed on the workpiece 2 where the machining solution does not flow. Therefore, if, under this condition, the machining solution 7 is kept jetted from the machining solution jetting unit 25c, then machining particles will precipitated on the workpiece 2 in the region 33c.

Figure 12:
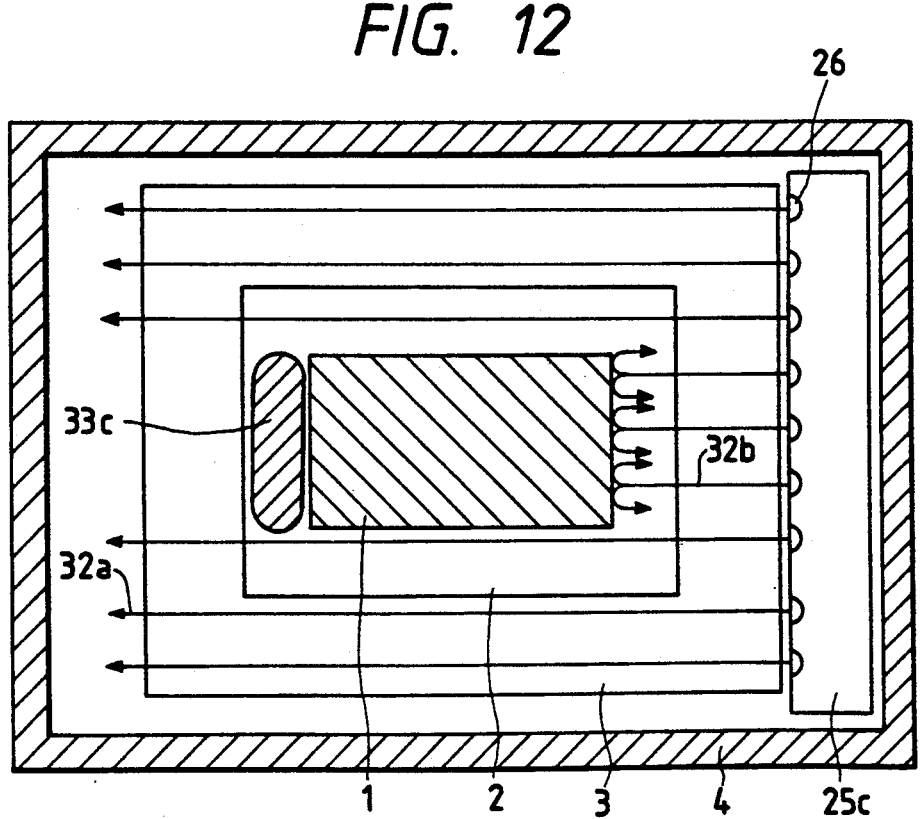
Figure 13:
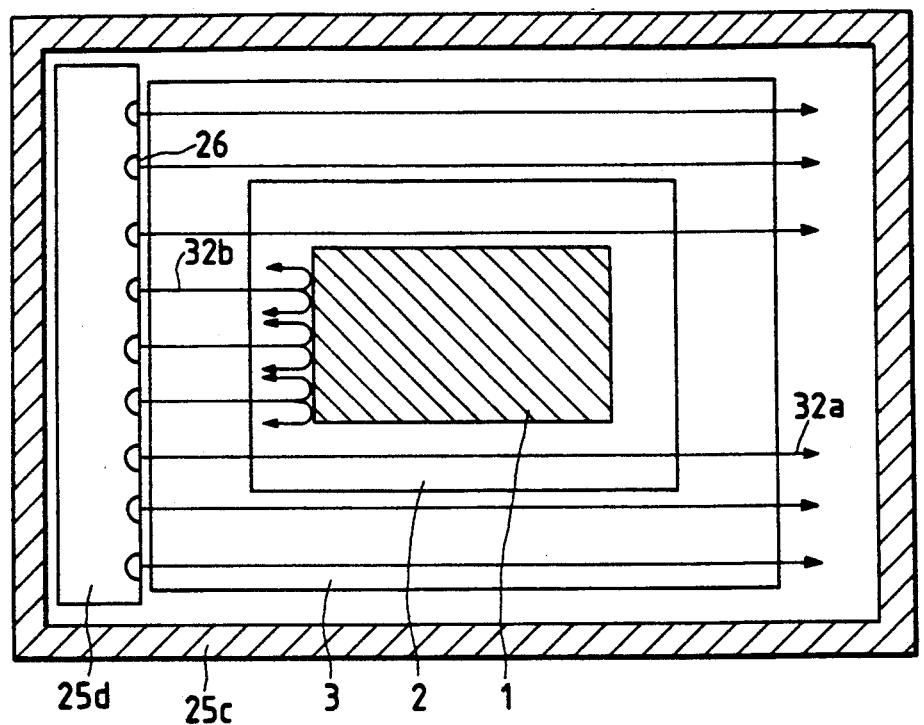

In order to eliminate this difficulty, the control valve 27c is closed to suspend the operation of the machining solution jetting unit 25c, and then the control valve 27d is opened to allow the machining solution jetting unit 25d to jet the machining solution in the opposite direction which has been set at a predetermined level, as shown in FIG. 13. As is apparent from the comparison of FIG. 13 with FIG. 12, the streams of machining solution is opposite in direction to those in FIG. 12, thus eliminating the region 33c where the machining solution does not flow when jetted from the other jetting. Thus, the precipitation of machining particles which is due to the fact that regions are formed where the machining solutions does not flow, is prevented.

In the above-described electric discharge machine, the machining solution jetting units 25a, 25b, 25c and 25d are activated in the stated order to jet the machining solution 7. However, the order of activation of these machining solution jetting units is not limited thereto or thereby.

In the case where the deposition of machining particles on the electrode 1 adversely affects the machining particles mixing concentration, it is necessary to jet the machining solution towards the upper surface of the electrode 1. For this purpose, the machining solution jetting units which can be moved vertically and confronted with each other, and the machining solution supplying pipes and the control valves provided therefor may be connected to the machining solution supplying pipe 8 (not shown).

The above-described electric discharge machine may be modified as follows: A pair of movable machining solution jetting units which can be changed in vertical position as desired are set in the machining solution at both ends similarly as in FIG. 1. In this modification, the movable machining solution jetting solutions are moved vertically in accordance with the thickness of the workpiece to be machined, and are activated alternately. Hence, the electric discharge machine thus modified may have the same effects as the electric discharge machine shown in FIG. 8.

The results of experiments on the precipitation of machining particles depending on machining-solution jetting directions will be described with reference to FIGS. 15(a) and (b), 16(a) and (b), 17(a) and (b) and 18(a) and (b). FIGS. 15(a), 16(a), 17(a) and 18(a) are plan views and FIGS. 15(b), 16(b), 17(b) and 18(b) are front views of the surface plate in the machining solution, respectively.

(1) Jetting the machining solution upwardly (cf. FIG. 15)

In the case of FIG. 15, the nozzle holes 26 of the machining solution jetting unit were directed obliquely upwardly. In this case, as indicated by the oblique lines 22 in the part (a) of FIG. 5, the machining particles precipitated on the whole upper surface of the surface plate 3. In FIG. 15, reference numeral 43 designates a jig for supplying the machining solution to the gap between the electrode and the workpiece.

(2) In jetting the machining solution in two directions which are perpendicular to each other (cf. FIG. 16)

The machining solution jetting units 25a and 25b were arranged by the surface plate in such a manner that they formed right angles, and the nozzle holes were directed slightly downwardly. In this case, the dead zone was formed behind the workpiece 2 and the jig 43, and the machining particles were deposited in the dead zone as indicated at 22. This reveals the fact that, depending on the arrangement of the workpiece and the jig in the machining vessel, the dead zone is formed which no machining solution reaches.

(3) In jetting the machining solution upwardly (cf. FIG. 17.).

The machining solution jetting units 25a and 25b positioned both sides of the workpiece were activated to jet the machining solution simultaneously. In this case, deposition of the machining particles occurred when the flow rate and pressure Of the machining solution jetted were not balanced with each other. In the case of FIG. 17, the pressure of the machining solution jetted from left was lower than that of the machining solution jetted from right, so that deposition of the machining particles took place on the left side of the jig 43.

(4) In jetting the machining solution in the opposite directions alternately (cf. FIG. 18)

The machining solution jetting units 25a and 25b were arranged in the same manner as in FIG. 17, and they were activated alternately to jet the machining solution. The machining solution was jetted in the same directions as in the electric discharge machine of the invention. Deposition of the machining particles was not observed at all.

As was described above, in the electric discharge machine of the invention, deposition of the machining particles in the machining vessel can be prevented, and the concentration of machining particles in the machining solution applied to the interelectrode gap can be maintained constant at all times. As a result, the various difficulties, such as the reduction of surface roughness, the occurrence of arcs, and the abnormal consumption of the electrode, accompanying the conventional electric discharge machine are eliminated. In addition, in the electric discharge machine of the invention, the machining particles in the machining vessel can be agitated only with the machining solution jetted from the machining solution jetting units. This feature contributes to a reduction in the manufacturing cost, and to ease of automation of the electric discharge machine.

What is claimed is:

1. An electric discharge machine comprising:
   a machining solution tank for storing a machining solution containing machining particles;
   a machining vessel filled with said machining solution to machine a workpiece;
   a machining solution circulating system for circulating said machining solution between said machining solution tank and said machining vessel; and
   a plurality of machining solution jetting means arranged in said machining vessel in opposition to each other, said machining solution jetting means being directed toward at least a side or sides of said workpiece not being machined by an electrode, said plural machining solution jetting means jetting said machining solution delivered thereto, through said machining solution circulating system from said machining solution tank, towards said workpiece in said machining vessel in a predetermined order.

2. An electric discharge machine according to claim 1, further comprising:
   auxiliary machining solution supplying pipes into which a machining solution supplying pipe of said machining solution circulating system branches,
   one of said auxiliary machining solution supplying pipes being provided with a filter unit which filters said machining solution to form a first machining solution containing no machining particles and a second machining solution containing machining particles at a high concentration; and
   a first pipe line for returning said second machining solution into said machining solution tank, and a second pipe line for supplying said first machining solution to said plurality of machining solution jetting means.

3. An electric discharge machine according to claim 1, wherein each of said machining solution jetting means in said machining vessel are movable vertically, and are activated in a predetermined order to jet the machining solution towards a face plate, said workpiece and said electrode in said machining vessel.

4. An electric discharge machine according to claim 1, wherein each of said plurality of machining solution jetting means comprises two machining solution jetting units disposed at two different levels in said machining vessel, said machining solution jetting units forming said machining solution jetting means being activated in a predetermined order to jet said machining solution toward a face plate, said workpiece, and said electrode in said machining vessel.

5. An electric discharge machine according to claim 4, wherein said machining solution jetting units forming said machining solution jetting means are movable vertically, to jet said machining solution towards said surface plate, said workpiece and said electrode in said machining vessel.

6. An electric discharge machine, comprising:
   a machining solution tank for storing a machining solution which contains machining particles;
   a machining vessel filled with said machining solution;
   a machining solution circulating system coupled to said machining solution tank and said machining vessel so as to be capable of circulating said machining solution between said machining solution tank and said machining vessel; and
   a plurality of machining solution jetting means arranged in said machining vessel in opposition to each other, said machining solution jetting means jetting said machining solution, delivered thereto by said machining solution circulating system from said machining solution tank, towards said workpiece in said machining vessel in a predetermined order;
   each of said plurality of machining solution jetting means being movable in a vertical direction, and being activated in a predetermined order so as to jet said machining solution in a direction towards a face plate, said workpiece and an electrode in said machining vessel.

7. An electric discharge machine, comprising:

a machining solution tank for storing a machining solution which contains machining particles;

a machining vessel filled with said machining solution;

a machining solution circulating system coupled to said machining solution tank and said machining vessel so as to be capable of circulating said machining solution between said machining solution tank and said machining vessel; and a plurality of machining solution jetting means arranged in said machining vessel in opposition to each other, said machining solution jetting means jetting said machining solution, delivered thereto by said machining solution circulating system from said machining solution tank, towards said workpiece in said machining vessel in a predetermined order;

said machining solution jetting means each comprising plural jetting units disposed at different levels in said machining vessel, said jetting units being activated in a predetermined order, said jetting units also being movable in a vertical direction so as to jet said machining solution towards a face plate, said workpiece and an electrode.

* * * * *